No. 701,733. Patented June 3, 1902.
W. S. JAMES.
COMBINED BAKING STOVE AND STEAM COOKER.
(Application filed July 16, 1901.)
(No Model.)
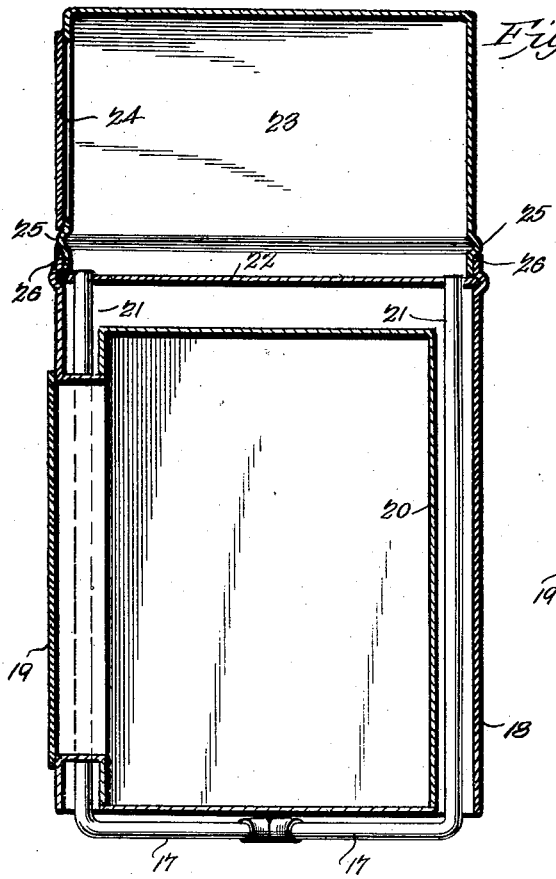
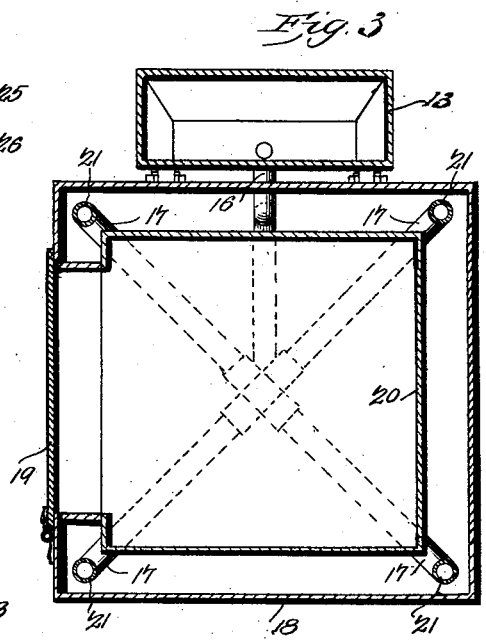
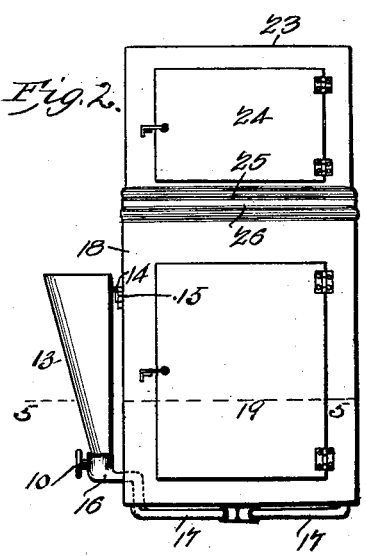
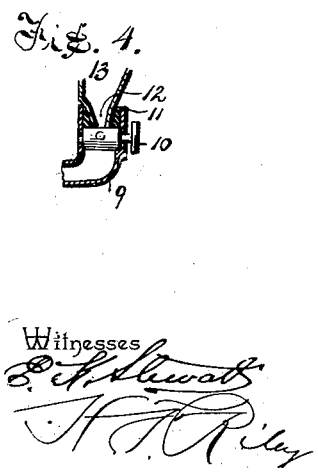
Witnesses
W. S. James, Inventor
by C. A. Snow & Co.
Attorneys
THE NORRIS PETERS CO., PHOTO-LITHO., WASHINGTON, D. C.

UNITED STATES PATENT OFFICE.

WILL S. JAMES, OF FORT WORTH, TEXAS.

COMBINED BAKING-STOVE AND STEAM-COOKER.

SPECIFICATION forming part of Letters Patent No. 701,733, dated June 3, 1902.

Application filed July 16, 1901. Serial No. 68,542. (No model.)

*To all whom it may concern:*

Be it known that I, WILL S. JAMES, a citizen of the United States, residing at Fort Worth, in the county of Tarrant and State of Texas, have invented a new and useful Combined Baking-Stove and Steam-Cooker, of which the following is a specification.

The invention relates to a combined baking-stove and steam-cooker.

The object of the present invention is to improve the construction of baking-stoves and steam-cookers and to provide a simple, inexpensive, and efficient one, to which water may be readily supplied from the exterior without opening it.

The invention consists in the construction and novel combination and arrangement of parts hereinafter fully described, illustrated in the accompanying drawings, and pointed out in the claims hereto appended.

In the drawings, Figure 1 is a vertical sectional view of a combined baking-stove and steam-cooker constructed in accordance with this invention. Fig. 2 is a side elevation of the same. Fig. 3 is a horizontal sectional view on the line 5 5 of Fig. 2. Fig. 4 is a detail sectional view illustrating the manner of mounting the removable water-receptacle on the elbow or pipe.

Like numerals of reference designate corresponding parts in all the figures of the drawings.

An elbow or pipe 16 is connected with bottom pipes 17, which are located beneath the lower casing 18 and which are adapted to rest upon a stove or to be heated by a suitable burner. The said elbow or pipe 16 has a cock or valve 10 for controlling the passage of water through it, and it is provided in its upwardly-extending portion with a packing or sleeve 11, having a central opening for the reception of a nipple or spout 12 of a receptacle 13, adapted to contain water. The receptacle 13, which is preferably tapered, is supported by a hook 14, secured to its upper portion and engaging a loop or bracket 15 of the lower casing 18. The receptacle is detachably supported to enable it to be readily removed, and when the cock or valve 10 is open water is allowed to percolate through the elbow or pipe. The casing 18, which is provided with a suitable door 19, has an inner shell 20, forming an oven and extending inward from the casing and united with the same adjacent to the door. The intervening space between the outer casing and the inner shell is adapted to contain hot air, and the oven is designed for baking purposes. The bottom pipes, which are diagonally arranged, as illustrated in Fig. 3, may be disposed in any other suitable manner, and they are connected with vertical pipes or tubes 21, located at the corners of the casing and extending upward through openings of the top 22 thereof and adapted to supply steam to an upper steam-cooker 23, consisting of a suitable casing provided with a door 24 and having suitable means for supporting the substances to be steamed. The steam passes up through the pipes 21 and fills the steam-cooker, and the casing thereof is provided with an exterior rib 25, arranged to rest upon an upper flange 26 of the lower casing. The rib is located above the lower edges of the upper casing, thereby forming a depending flange which fits within the flange of the lower casing.

What is claimed is—

1. The combination of a lower casing having an inner shell forming an oven, upright pipes extending through the top of the casing, an upper casing mounted upon the lower casing and forming a steamer, an exterior pipe or tube connected with the said pipes, a receptacle having a nipple or spout fitting in the exterior pipe or tube, and means for controlling the flow of water into the said pipes, substantially as described.

2. The combination of a lower casing open at the bottom and provided at its top with openings, an inner shell forming an oven, upright pipes arranged in the spaces between the inner shell and the lower casing and extending through the openings of the top of the latter, bottom pipes connecting the upright pipes, an exterior pipe or tube extending into the casing and connected with the said pipes, an upper steam-cooker consisting of a casing open at the bottom and mounted upon the said casing, an exterior receptacle designed to contain water and supported by the lower casing and having a nipple or spout fitting in the exterior tube or pipe, and means for controlling the flow of water from the receptacle, substantially as described.

In testimony that I claim the foregoing as my own I have hereto affixed my signature in the presence of two witnesses.

WILL S. JAMES.

Witnesses:
E. Q. GATTEYS,
HICK BALLENTINE, Jr.